US012243087B2

(12) United States Patent
Zhao et al.

(10) Patent No.: US 12,243,087 B2
(45) Date of Patent: Mar. 4, 2025

(54) METHOD AND SYSTEM FOR SUBSTITUTING ITEMS

(71) Applicant: Ocado Innovation Limited, Hatfield (GB)

(72) Inventors: Qiaole Zhao, St Albans (GB); Adrian Foltyn, Wrocław (PL); Lukas Schaffner, Pettendorf (DE)

(73) Assignee: Ocado Innovation Limited, Hatfield (GB)

( * ) Notice: Subject to any disclaimer, the term of this patent is extended or adjusted under 35 U.S.C. 154(b) by 0 days.

(21) Appl. No.: 18/222,966

(22) Filed: Jul. 17, 2023

(65) Prior Publication Data

US 2025/0029164 A1    Jan. 23, 2025

(51) Int. Cl.
*G06Q 30/00* (2023.01)
*G06Q 30/0601* (2023.01)

(52) U.S. Cl.
CPC ..... *G06Q 30/0629* (2013.01); *G06Q 30/0635* (2013.01)

(58) Field of Classification Search
CPC .............. G06Q 30/0629; G06Q 30/0635
See application file for complete search history.

(56) References Cited

U.S. PATENT DOCUMENTS

| 2022/0237530 A1* | 7/2022 | Franey | G06Q 10/047 |
| 2024/0013123 A1* | 1/2024 | Latha | G06Q 10/06313 |

OTHER PUBLICATIONS

"Predictively Offering and Selling Substitutes for Products and Services from the Enterprise Catalog." https://ip.com/IPCOM/000264885. (Year: 2021).*

* cited by examiner

*Primary Examiner* — Anand Loharikar
(74) *Attorney, Agent, or Firm* — Dinsmore & Shohl LLP

(57) ABSTRACT

Certain aspects of the disclosure provide methods and systems for determining substitutes for an item in a computationally efficient way.

17 Claims, 10 Drawing Sheets

METHOD AND SYSTEM FOR SUBSTITUTING ITEMS

INTRODUCTION

Technical Field

The present invention relates to a method and system for determining substitutes for an item in a computationally efficient way.

Background

In an e-commerce setting, a customer may order a number of items. However, it is not always possible to fulfil a customer order due to certain items being out of stock. For any such out of stock item, an alternative or substitute item can be offered to the customer. Ideally, the substitute item will be accepted by the customer. However, in certain sectors, such as grocery, a customer may be inclined to reject a substitute should they deem it not to be equivalent to the item ordered.

Identifying a substitute that is likely to be accepted is not straightforward in the grocery sector. Both the overall number of items, and the potential substitutes for each item can be significant. It is also not as straightforward as replacing an item with a similar item. For example, a customer who ordered a bunch of seven bananas may nonetheless reject, as a substitute item, a bunch of six bananas. Despite the apparent similarity in the ordered item and substitute item, the user may have placed the order on the basis of other factors such as brand, ripeness, cost, method of produce (such as organic) etc. Whilst retailers can enforce fixed substitutes (i.e. item y is a substitute for item x) in an attempt to take account of these nuances, this can be somewhat of a blunt instrument. Other solutions include a human in the loop that makes a subjective judgment on the spot. For example, a human picker may realize there is currently no beer available at an in-store location, and instead picks a near-by similar looking item. However, assuming the beer was alcoholic and the similar looking item was non-alcoholic, customer rejection is more likely. If the picker had an acceptable list of substitutes that lower the rate of customer rejection, this problem could be avoided.

It is therefore desirable to leverage the vast amount of data stored in an e-commerce platform about the items, customers, and retailers to determine a substitute. Some retailers have up to 100,000 items that a customer could order. The number of customers that shop with a given grocer can be in the order of millions. The items themselves and the associated data can be significant and updated on a regular basis. Efficiently processing such a vast data set to recommend substitutes that are less likely to be rejected is a challenge. Further, given an e-commerce grocery platform has to process a large number of orders, the time taken to determine a substitute item in the incoming order pipeline should be minimized. As a further consideration in an automated storage and retrieval system, ASRS, such as that described in WO2015019055A1 ("Ocado"), hereby incorporated by reference, it is better not to use the automated resources to pick a substitute item than to do so and have it rejected. Over time, the wasteful use of automated resources can add up to a significant cost.

SUMMARY

In an aspect, there is provided a computer-implemented method for analyzing a plurality of items, the method including: identifying a target item; identifying, using a first trained model, at least one similar item to the target item; identifying, using a second trained model, a primary category of the target item and the at least one similar item; identifying, using a third trained model, potential substitutes for the target item based on the at least one similar item, the primary category of the target item, and the primary category of the at least one similar item; and ranking, using a fourth trained model, the potential substitutes based on a rejection probability of each of the potential substitutes.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for efficiently processing a vast data set (such as that of an e-commerce grocery platform) to recommend substitutes that are less likely to be rejected.

A retailer wishing to build a substitute list for each item that it sells requires a significant undertaking. A data set covers each item described using a number of attributes including at least one of identifier, name, description, category name, brand, price, volume, weight, back-of-pack tags or item tags (i.e. key item characteristics such as "vegan", "kosher", "alcoholic", "flammable"), customer revenue segment (e.g. items in same revenue segment), sales trend, seasonality, or rejection rate. With an increasing number of items and customers, the data set grows in size, which complicates analysis. A basic analysis of this data set may allow an acceptable substitute to be determined. However, a detailed analysis allows the "best" substitute to be determined in that the probability of rejection by a customer is minimized. A system to automatically process this immense data set to reduce the rejection of substitutes is desirable.

Figure 1:
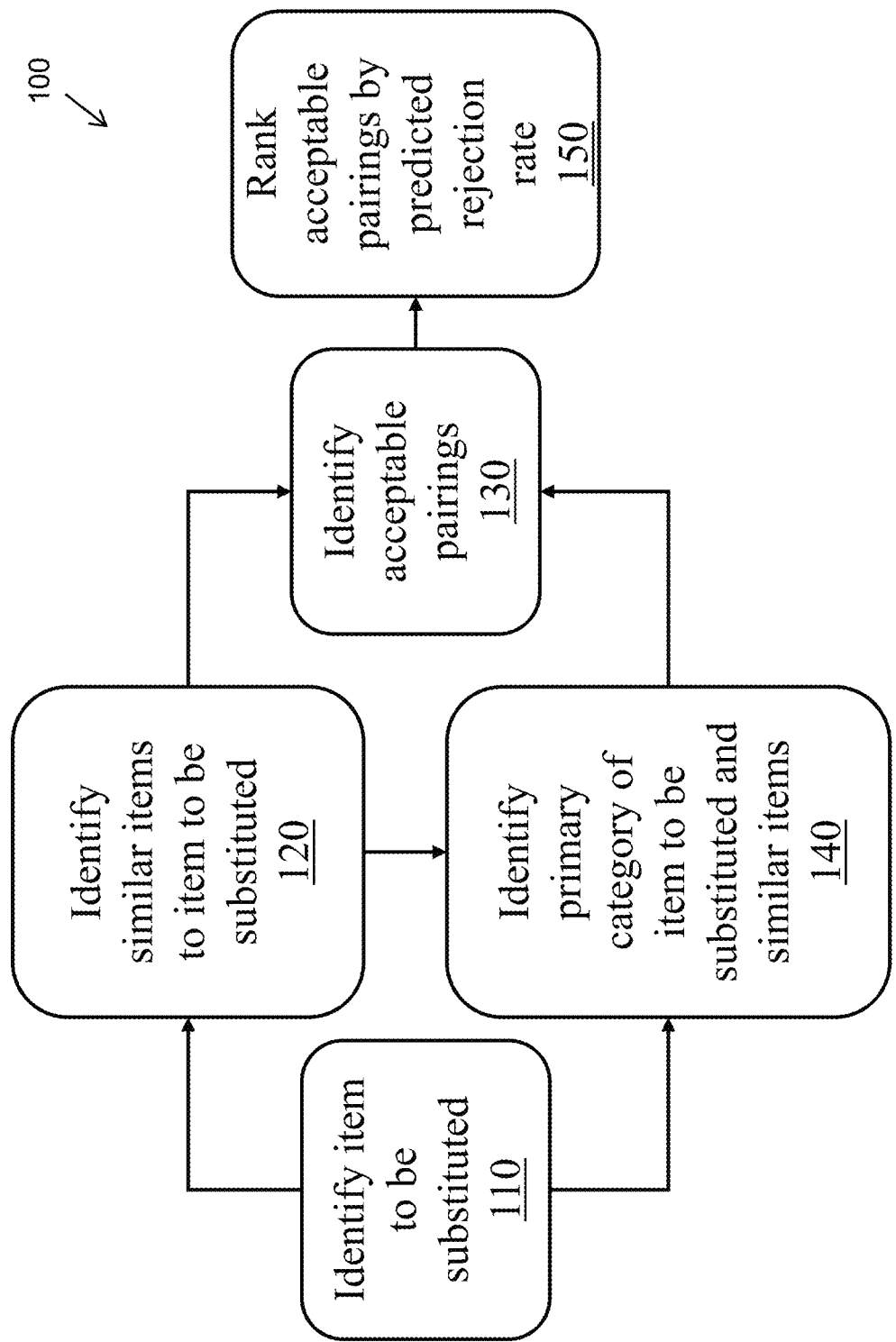
FIG. 1 depicts a processing flow of data to determine a substitute item.

FIG. 1 shows a high level diagram 100 of how such a data set can be processed to reduce the rejection of substitutes. In block 110, an item to be substituted is identified. This may be the result of the unavailability of the item, which may be a grocery item ordered via an e-commerce system. Although this is one example use, it would be appreciated that an "item to be substituted" includes an item for which a substitute item is to be identified (i.e. should an item become unavailable, a substitute can be identified; in other words, the item itself may be currently available, but a substitute nonetheless has been identified). In various examples described herein, an "item to be substituted" may be referred to as a "target item." At least one item similar to the item to be substituted can be determined by block 120. For example, if the item to be substituted has pizza in its name, all pizzas (irrespective of type) should be identified by block 120. It should be noted that each item may be denoted using a respective identifier. The output of block 110 is a list of pairings, where each pair includes the item to be substituted and a respective one of the similar items. It can be appreciated that block 110 provides an initial data filtering step.

These pairings are evaluated by block 130 to limit the pairings to a number of acceptable pairings. As part of this process, block 130 receives input from block 140, which can identify a primary category for the item to be substituted and each of the similar items. A primary category is the single most relevant category for each item (for example sausages may be listed under the categories of BBQ, Offer 2-4-1 (i.e. 2 items for the price of 1), Meat & Poultry etc., but the most relevant primary category is sausages). The inventors have found that knowledge of the primary category of each item can help effectively limit the pairings to acceptable pairings. In other words, acceptable pairings are those which define an item to be substituted and a "good" substitute. When the acceptable pairings (or potential list of substitutes) have been determined, they can be ranked using the predicted rejection rate (i.e. how likely it is that a chosen substitute item for the item to be substituted, is rejected by a customer) determined by block 150.

The inventors have found that the processing carried out by blocks 110, 120, 130, 140 and 150 can automatically execute a complex analysis of a large data set to determine the "best" substitute for a given item. Each of the blocks 110, 120, 130, 140, and 150 is implemented using a respective machine learning model, each of which is explained in more detail below.

Figure 2:
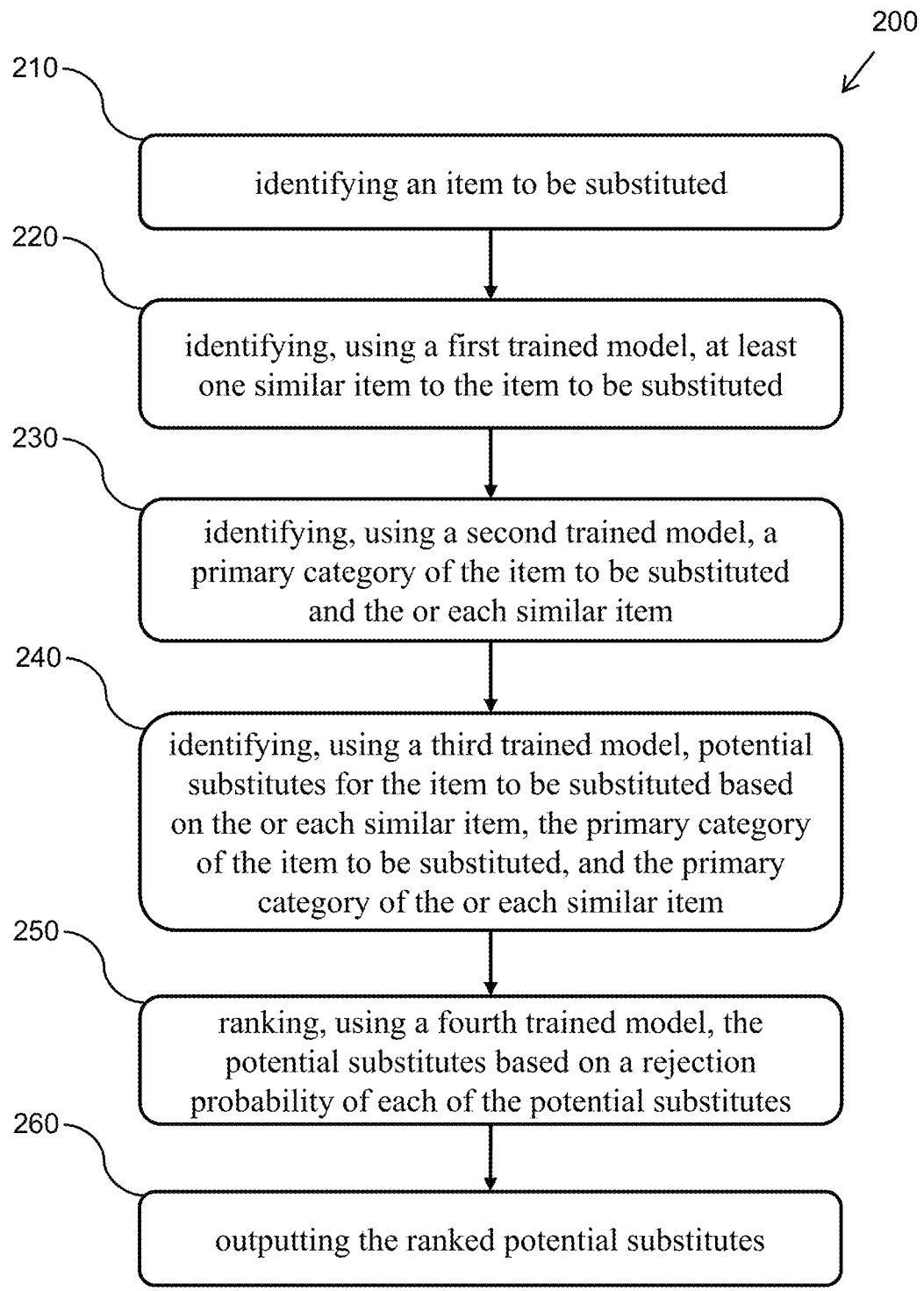
FIG. 2 depicts a method of determining a substitute item.

FIG. 2 shows a method 200 carried out by the processing blocks of FIG. 1. In step 210, an item to be substituted (e.g., "a target item") is identified. In step 220, using a first trained model, at least one similar item to the item to be substituted, is identified. In step 230, using a second trained model, a primary category of the item to be substituted and the one or more similar items, is identified. In step 240, using a third trained model, potential substitutes for the item to be substituted based on the at least one similar item, the primary category of the item to be substituted, and the primary category of the at least one similar item, are identified. In step 250, using a fourth trained model, the potential substitutes based on a rejection probability of each of the potential substitutes, are ranked. In step 260, the ranked potential substitutes are output.

Figure 3:
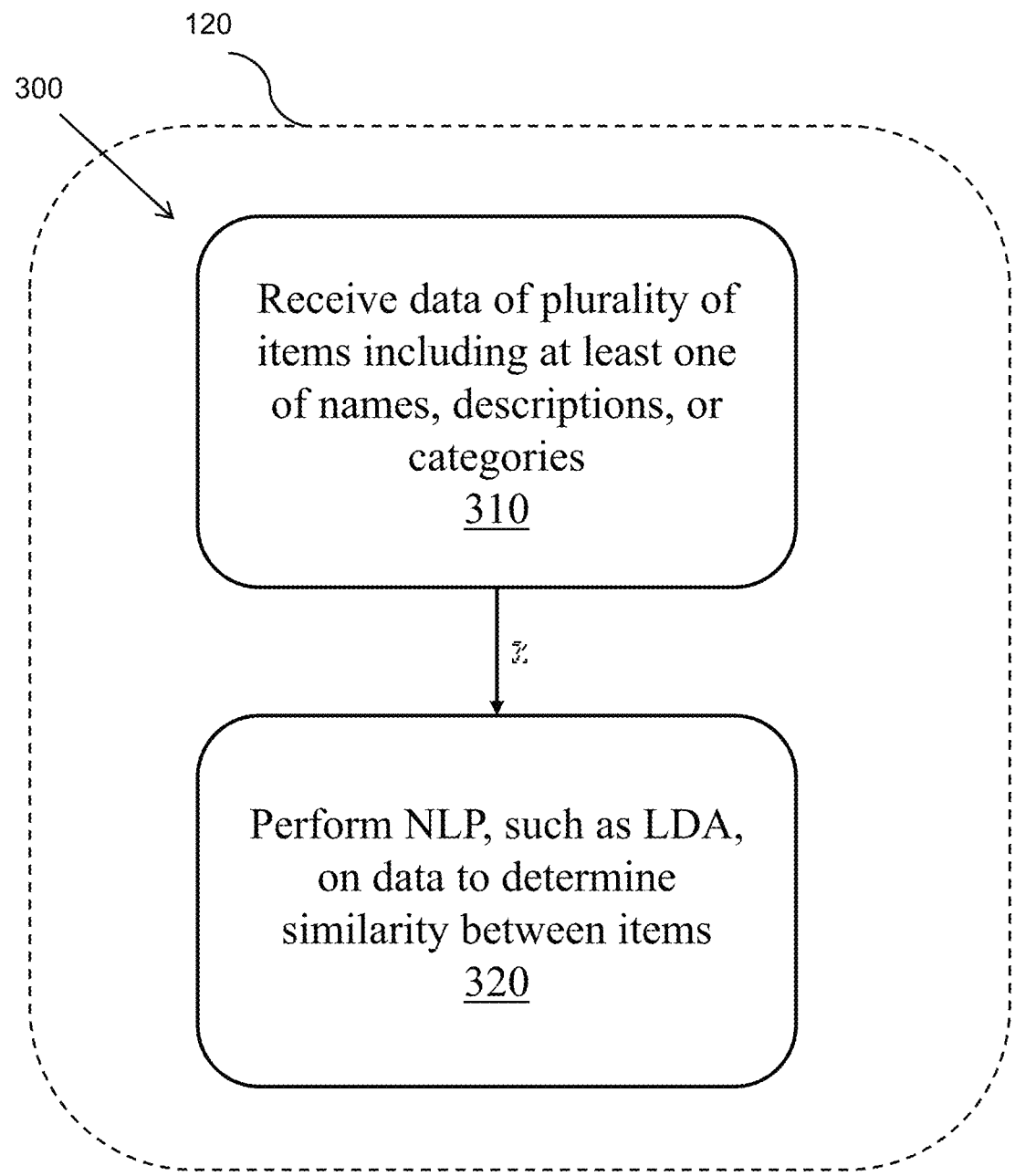
FIGS. 3-6 depict detailed processing flows of blocks depicted in FIG. 1.

FIG. 3 shows a processing diagram 300 of block 120 in detail. Block 310 may receive data of the items including at least one of names of the plurality of items, descriptions of the plurality of items, or categories of the plurality of item. The plurality of items, descriptions of the plurality of items, or categories of the plurality of items may be processed by block 320, which can be a Natural Language Processing, NLP, such as a Latent Dirichlet Allocation, LDA, process to determine the number of topics to which a given item belongs. The more topics a pair of products share in common, the more likely they are to be similar. For example, a vegetarian pizza will have more topics (e.g. name, crust type and base size) common with a meat pizza, compared to a vegetarian lasagna. It will be appreciated that the LDA model can be developed using supervised or unsupervised machine learning. An appropriate training data set ensures that a good range of topics are identified.

Figure 4:
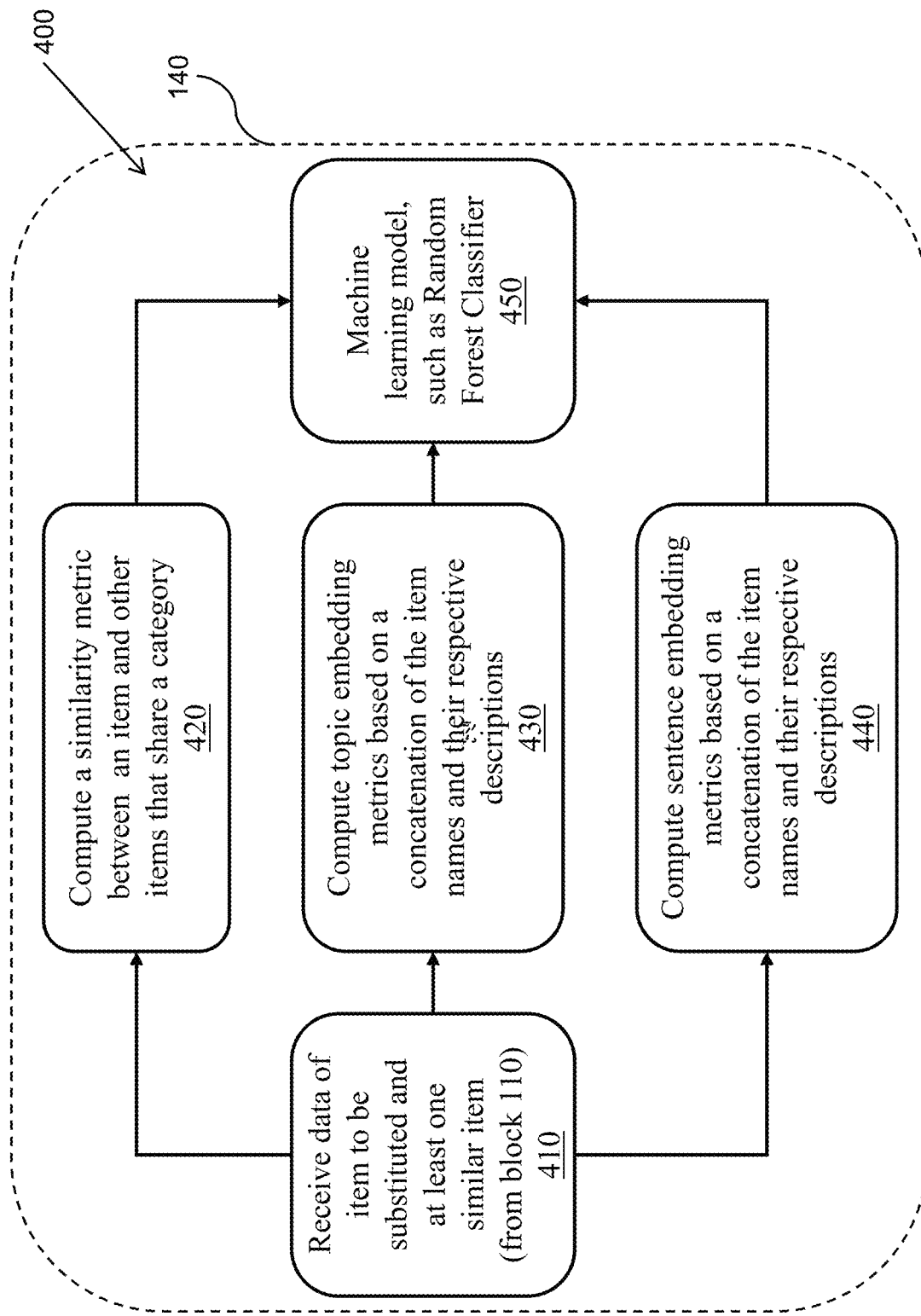

FIG. 4 shows a processing diagram 400 of block 140 in detail. Block 410 may receive data of the items including at least one of the item to be substituted and each similar item (i.e. the pairings produced by block 110), a name of the item to be substituted and a name of each similar item, or a description of the item to be substituted and a description of each similar item.

Block 420 may compute a similarity metric, such as the Jaccard index or Jaccard similarity index between the categories of the items. To compute the similarity, each item in the pairings may be grouped according to the each of the categories to which it is assigned. If an item in each category is similar to several other items in a given category, it will score higher on the similarity metric. For example, assuming ice-cream was assigned to the offer 2-4-1 category (amongst other categories), it is unlikely to be found to be similar to other items in that category, such as sausages, soft drinks, chocolate bars etc. However, ice-cream should be found to be similar to other products in a frozen dairy dessert category. It can be appreciated that the process carried out by block 420 analyses the items composing a category, rather than the category itself, which helps eliminate the influence of less relevant categories in determining a substitute item. In other words, an analysis of the items themselves is best placed to determine the primary category.

Block 430 may compute topic embedding metrics, using LDA for example, based on a concatenation of the item names and their respective descriptions. Block 430 may compute sentence embedding metrics, using Global Vectors, GloVe, for example based on a concatenation of the item names and their respective descriptions. The GloVe sentence embeddings may undergo dimension reduction to reduce processing burden by reducing the size of the GloVe sentence embedding metrics by extracting relevant information and disposing the rest of the information as noise. One suitable technique for dimension reduction may be Principal Component Analysis, PCA. PCA is a projection based method which transforms the data by projection it onto a set of orthogonal axes.

At least one of the outputs of blocks 420, 430, and 440 may be input to machine learning model 450, which may be a random forest classifier. Block 450 may process the outputs of blocks 420, 430, and 440 to deduce the most relevant, or primary category of each item. Machine learning model 450 may be trained using supervised learning using training data comprising a primary category for each item of a subset of the plurality of items. Deducing the primary category for each item can be used to reduce the number of substitutes that have to be further processed to identify the "best" substitutes.

As well as or instead of deducing the primary category, the model may also deduce the primary category tree. A category tree may include a primary category, a primary parent category, and a primary grandparent category. For example, an item may have a primary category of yogurt, a parent primary category of breakfast, and a primary grandparent category of healthier living.

Alternatively, in a computationally simpler implementation, blocks 430, 440, and 450 may be dispensed with and the similarity metric alone can be used to deduce the primary category and/or the primary category tree.

Figure 5:
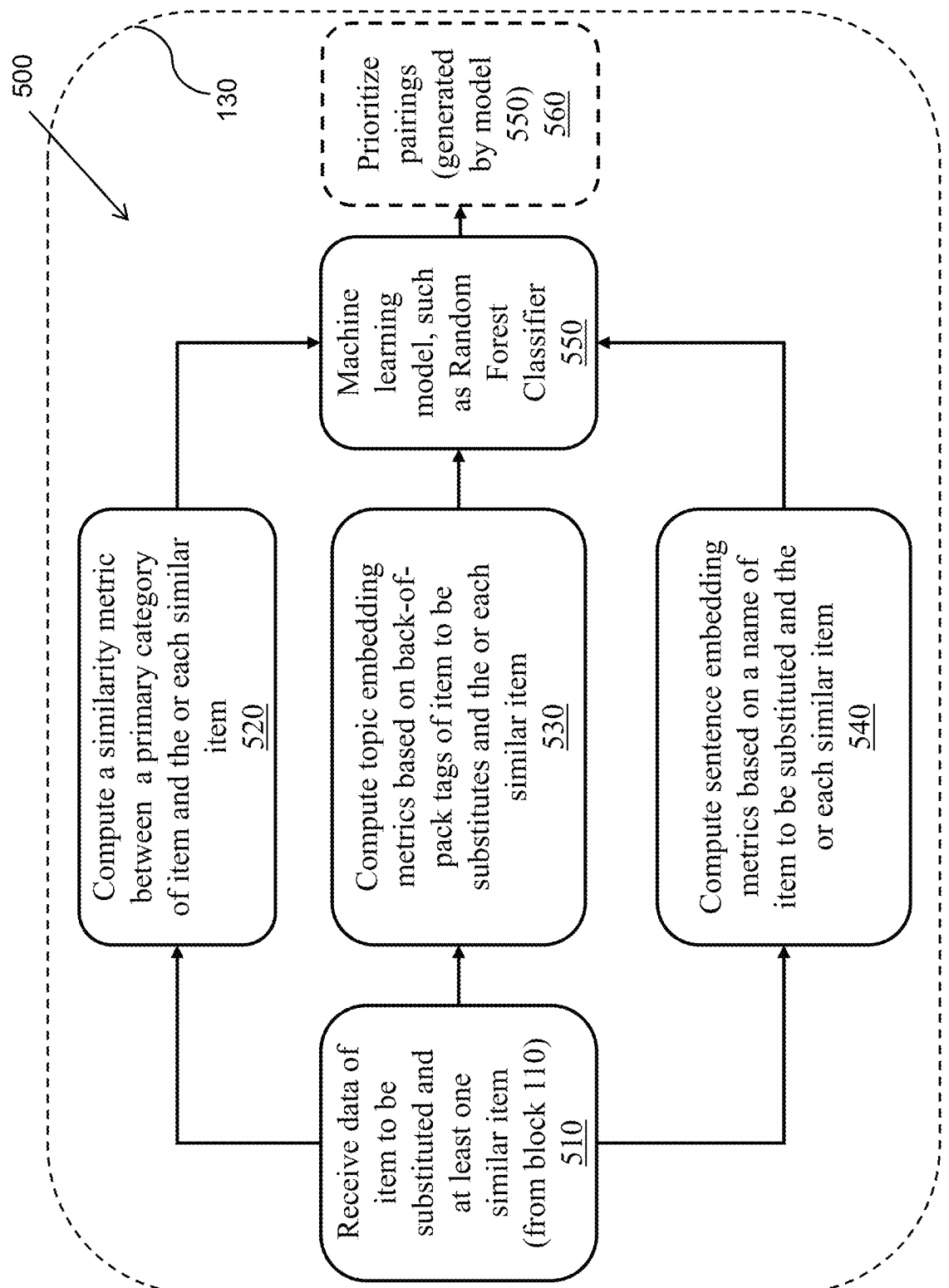

FIG. 5 shows a processing diagram 500 of block 130 in detail. Block 510 may receive data of the items including at least one of the item to be substituted and each similar item (i.e. the pairings produced by block 110), a plurality of back-of-pack tags of the item to be substituted and a plurality of back-of-pack tags of each similar item, or a name of the item to be substituted and a name of each similar item.

Block 520 may compute a similarity metric, such as the Jaccard index or Jaccard similarity index between the primary categories of each item of an item pairing. The primary categories can be deduced using block 120 or the process flow of FIG. 4.

Block 530 may compute topic embedding metrics, using LDA for example, based on the plurality of back-of-pack tags of the item to be substituted and a plurality of back-of-pack tags of each similar item. Block 540 may compute sentence embedding metrics, using Global Vectors, GloVe, for example based on the name of the item to be substituted and a name of each similar item. Dimension reduction may be employed to reduce the processing burden of the GloVe embeddings.

At least one of the outputs of blocks 520, 530, and 540 may be input to machine learning model 550, which may be a random forest classifier. Block 550 may process the outputs of blocks 520, 530, and 540 to deduce acceptable pairings (or potential substitutes). Machine learning model 550 may be trained using supervised learning using training data comprising both acceptable and unacceptable pairings. Typically, such training data cannot be derived from that provided by a retailer, assuming the retailer has a system of deciding fixed substitutes. A retailer typically only issues what it considers to be acceptable or "good" substitutes that have a low rejection rate. However, training model 550 on such a data set means it will not be able to discriminate between "good" and "bad" substitutes. Instead, the model 450 will learn how to discriminate between "good" and less "good" substitutes. The inventors have found that customizing the training data to include both "good" and "bad" substitutes greatly improves the trained model's performance. Introducing "bad" substitutes to a retailer's existing fixed list of substitutes is sufficient. Thus, block 130 and process 500 represent an important step in identifying "good" substitutes since existing rejection rates are not considered, which otherwise would result in overfitting.

The acceptable pairings output from block 550 may be input to block 560 to prioritize the number of pairings. Each pairing may have additional data supplemented such as primary category, or primary category tree, brand, and unit size etc. The more matching additional data each pairing has, the higher that pairing is prioritized. Only the top priority pairings may be submitted to block 140. For example, if three pairings have matching additional data in three areas (i.e. primary category, brand, and unit size), they will be marked as priority 1, whereas a further 3 items that only match in two areas will be marked as priority 2. It will be appreciated that this is an optional step that serves to filter the number of potential substitute items that have to be evaluated by block 120. Alternatively block 560 may be applied after the processing of block 140 or process 600 referenced below.

Figure 6:
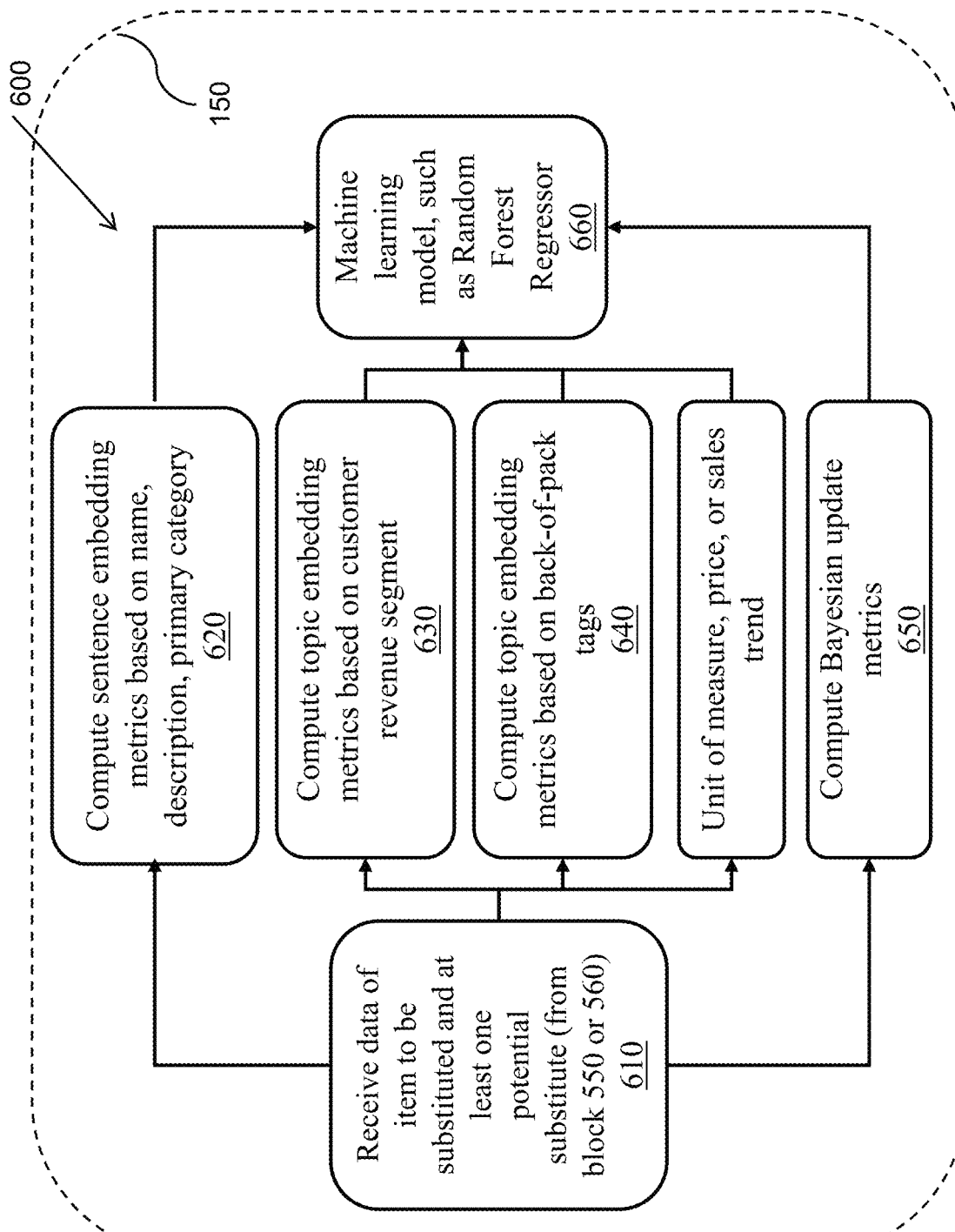

FIG. 6 shows a diagram 600 of block 150 in detail. Block 610 may receive data of the items including at least one of a first subset comprising at least one: of a name of the item to be substituted and a name of each similar item of the potential substitutes, a description of the item and a description of each similar item of the potential substitutes, or a primary category of the item and a primary category of each similar item of the potential substitutes (which can be derived from block 120 or process 400); a customer revenue segment of the item to be substituted and a customer revenue segment of each similar item of the potential substitutes; back-of-pack tags of the item to be substituted and back-of-pack tags of each similar item of the potential substitutes; a second subset comprising at least one of: a unit-of-measure of the item to be substituted and a unit-of-measure of each similar item of the potential substitutes, a price of the item to be substituted and a price of each similar item of the potential substitutes, or a sales trend of the item to be substituted and a sales trend of each similar item of the potential substitutes; or a rejection rate of each similar item of the potential items when selected as a substitute of the item to be substituted. The rejection rate may be based on historical data of the item such as how often it was rejected when offered as a substitute to the item to be substituted. The rejection rate may include timestamped data to allow for seasonal variations, and other data inferences. The rejection rate may also include data from retailer initiated rejections (i.e. rejected before the item is offered to the customer).

Block 620 may compute sentence embedding metrics, using Global Vectors, GloVe, for example based on the first subset. Dimension reduction may be employed to reduce the processing burden of the GloVe embeddings. Block 630 may compute topic embedding metrics, using LDA for example, based on the customer revenue segment of the item to be substituted and a customer revenue segment of each similar item of the potential substitutes. Block 640 may compute topic embedding metrics, using LDA for example, based on the plurality of back-of-pack tags of the item to be substituted and a plurality of back-of-pack tags of each similar item. Block 650 may compute Bayesian updates to define a rejection rate metric. At least one of the outputs of blocks 620, 630, 640, 640 or the second subset may be input to machine learning model 660, which may be a random forest regressor. The output of block 660 is a predicted rejection rate of each substitute of the potential substitutes. The predicted rejection rate can be used to rank the potential substitutes such that the lower the likelihood of rejection, the higher a potential substitute is ranked. Other factors can be considered and weighted in the ranking process, such as the output of block 560 and/or specific retailer requirements. In one example, the predicted rejection rate may have a first weight, the output of block 560 a second weight, and retailer requirements (such as a price similarity) a third weight. Machine learning model 660 may be trained using supervised learning using training data comprising actual retailer rejection rates for items when offered as substitutes for an item to be substituted.

Whilst the processing carried out by block 120 and shown in diagram 300 can be used to carry out an initial filtering step, this processing can be omitted. This may mean that the remaining blocks (i.e. 130, 140, 400, and 500) process a larger set of data (i.e. all items). Although this may increase the processing burden of the remaining blocks, the processing of blocks 120 and 300 is not required, so the overall time taken and processing resources may not increase.

The processes/models shown in FIGS. 1-6 may be run on a periodic basis and the potential substitutes for each item can be stored in a look-up table or database for example. It may be advantageous to run each block at different intervals. For example, blocks 120, 140, 300, and 400 may not need to be run in real-time. Rather, these blocks may be run periodically, at a first interval, and their outputs (i.e. determining similar items, and the primary category of each item) may be stored in a look-up table and/or database. Similarly, blocks 120, 140, 300, and 400 may be run and re-trained periodically based on up-to-date data sets. Blocks 130, 150, 500, and 600 may be run periodically, at a second interval. The first interval may be greater than the second interval since similar items and primary categories are less subject to change on a day-to-day basis, whereas data relevant to the potential substitutes and ranking thereof can change on a day-to-day basis. Therefore, using different intervals reduces the overall computational processing burden. Accordingly, blocks 130 and 500 may be run at the second interval, whereas blocks 150 and 600 may be run at a third interval, where the third interval is less than the second interval. Similarly, blocks 130, 150, 500, and 600 may be re-trained periodically based on up-to-date data sets. It may be advantageous to re-train blocks 130, 150, 400 and 600 using data generated over a rolling period. For example, the most recent rejection data generated by a retailer can be used to re-train blocks 150 and 600.

Figure 7:
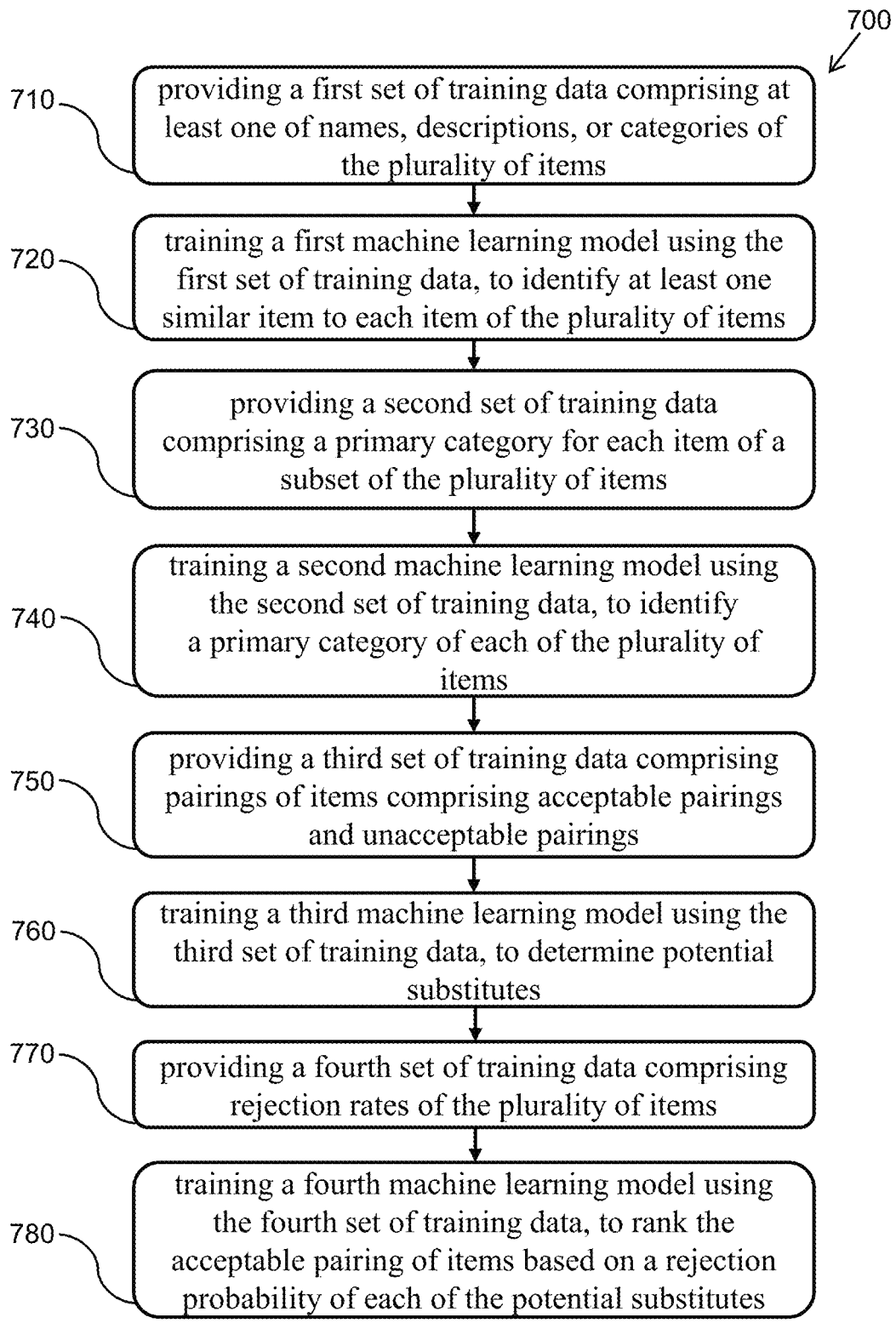
FIG. 7 depicts a method of training machine learning models to determine a substitute item.

It will also be appreciated from the processes shown in FIGS. 1, and 3-6 that there is provided a method 700 of training machine learning models for determining a substitute for an item of a plurality of items, as shown in FIG. 7. In step 710, a first set of training data comprising at least one of names, descriptions, or categories of the plurality of items, is provided. In step 720, a first machine learning model is trained using the first set of training data, to identify at least one similar item to each item of the plurality of items. In step 730, a second set of training data comprising a primary category for each item of a subset of the plurality of items, is provided. In step 740, a third set of training data comprising pairings of items comprising acceptable pairings and unacceptable pairings, is provided. In step 750, a third machine learning model is trained using the third set of training data, to determine potential substitutes. In step 760, a fourth set of training data comprising rejection rates of the plurality of items, is provided. In step 770, a fourth machine learning model is trained using the fourth set of training data, to rank the potential substitutes based on a rejection probability of each of the potential substitutes.

It will be appreciated that the processes/methods described above in FIGS. 1-7 are not limited to a system that determines substitutes per se. Rather, the processes/methods above allow equivalent items to be determined. That is, items that are as identical as possible in terms of properties of the items, can be identified.

Figure 8:
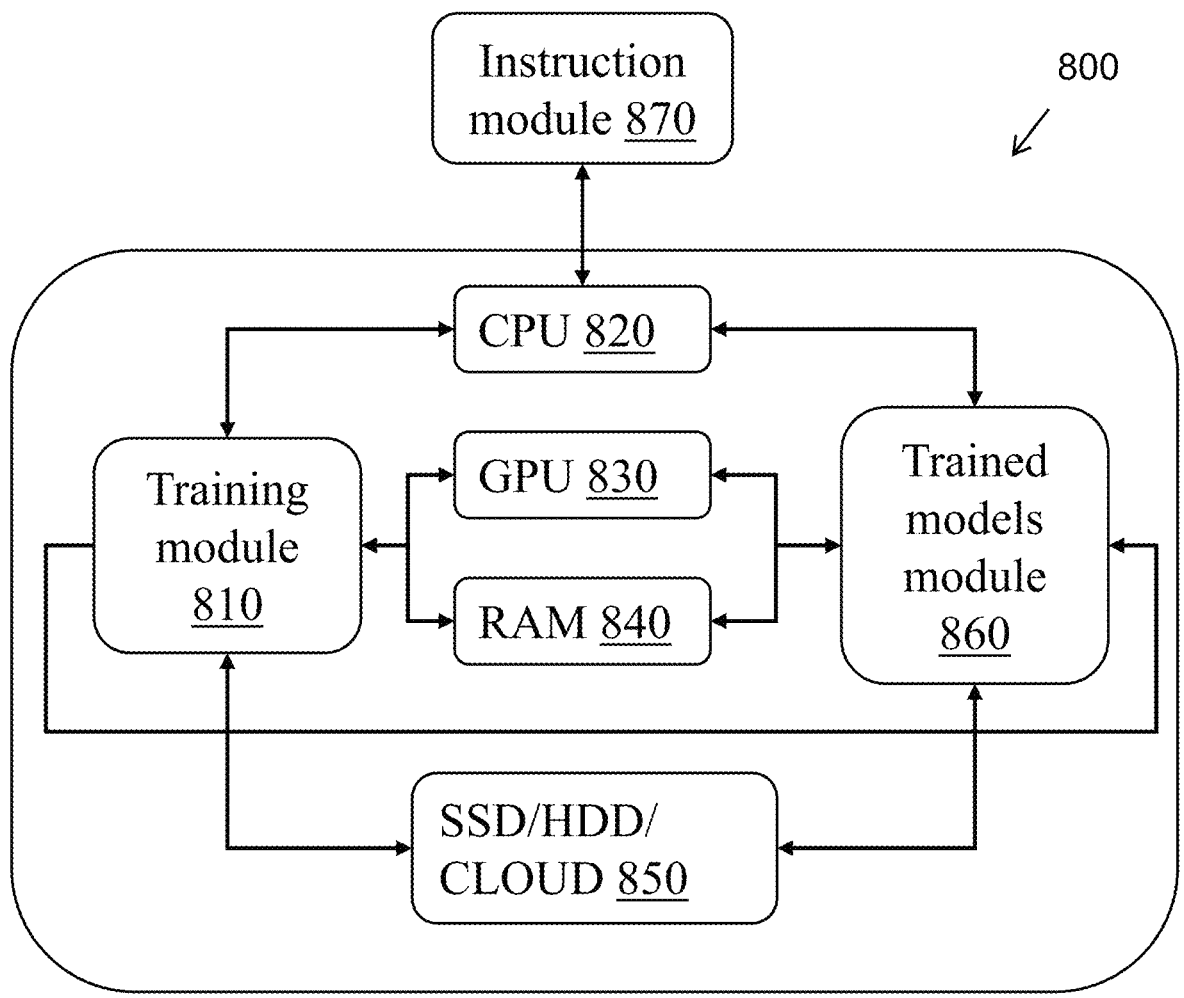
FIG. 8 depicts a system for carrying out the processing and methods of FIGS. 1-7.

A system 800 for performing the processes/methods of FIGS. 1-7 is shown in FIG. 8. A training module 810 is suitably programmed to carry out the training processes of FIGS. 1, and 3-7 by interfacing with central processing unit, CPU, 820, graphical processing unit, GPU, 830, memory or random access memory, RAM 840, and solid state drive, SSD, and/or hard disc drive, HDD, and or a cloud computing environment, 850. CPU 820 may execute the steps of the processes of FIGS. 1, and 3-7 which concern inputting the training data sets to the respective machine learning models. GPU 830 may execute the processes/methods of FIGS. 1-7 which concern executing the machine learning models. RAM 840 may be accessed as appropriate by the training module 810. The training data may be provided by SSD/HDD/CLOUD 850. The training module 810 may also interact with trained model module 860. The trained model module 860 carries out the processes/methods of FIGS. 1-6. The trained model module 860 also interfaces with each of the CPU 820, GPU 830, RAM 840, and SSD/HDD/CLOUD 850. The CPU 820 may perform the metric processing of FIGS. 1-6, whereas GPU 830 may execute the processes/methods of FIGS. 1-6 which concern executing the trained models via the trained model module 860. The data concerning a number of items, where at least one item is to be substituted may be provided by SSD/HDD/CLOUD 850. It will be appreciated that each of the CPU 820, GPU 830, RAM 840, SSD/HDD/CLOUD 850, training module 810, and trained model module 860 may be implemented as discrete elements either in a single location, or across multiple locations using a cloud computing environment. Example cloud computing environments include Amazon Web Services™, Microsoft Azure™, Google Cloud Platform™, and IBM Cloud™.

Figure 9:
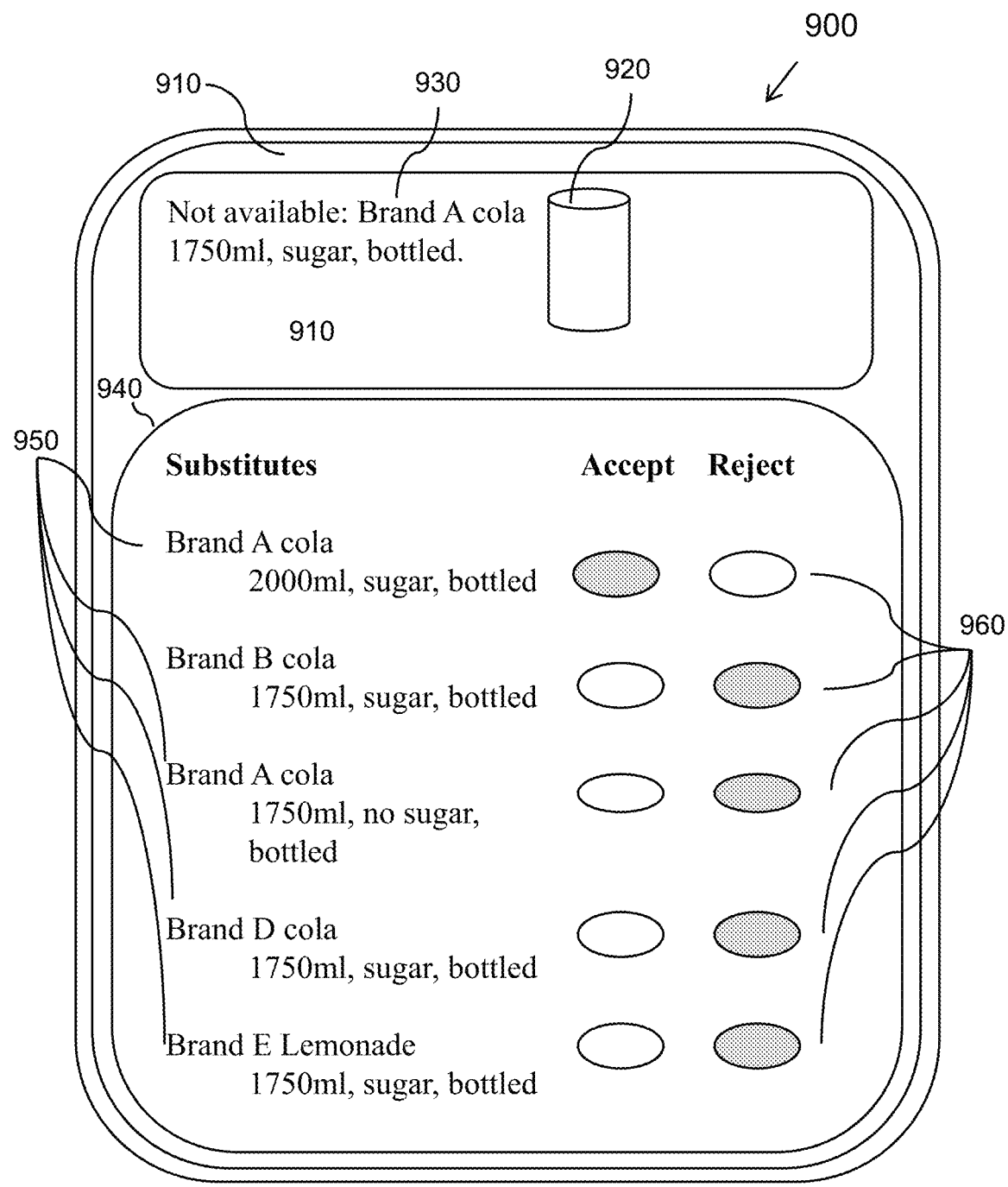
FIG. 9 depicts a user interface for accepting/rejecting a potential substitute item.

The CPU 810 may interface with instruction module 870 to indicate at least one substitute item (as determined by the processes/methods of FIGS. 1-6) for an item to be substituted. The instruction module may interact with the system 900 of FIG. 9 to generate a user interface 910. The system of FIG. 9 can take the form of a user device such as an electronic device or smartphone (running iOS™ or Android™, provided by Apple™ and Google™ respectively), or a virtual reality headset, or an augmented reality headset. The user device may have an interactive display which can output information and receive and/or respond to a user input. The user device may also have a wireless communication system such as a cellular network and/or Wi-Fi™, and/or near-field communication, and/or Bluetooth™. The user interface may show an item to be substituted 920 and accompanying information 930, such as item description, brand unit of measurement, price etc. A ranked list of substitutes 940, as generated by the processes and methods of FIGS. 1-6 is also displayed. Each substitute 950 may have respective accompanying information such as item description, brand unit of measurement, price etc. Each substitute may also have an accompanying user interface input element 960 to indicate acceptance and/or rejection of the substitute. In the example shown, the filled-in input elements are used to indicate the acceptance or rejection of an item. A user can therefore approve the substitute before it is integrated into an original list of items (e.g. a customer of order) to take the place of an item to be substituted. Alternatively, system 900 may be configured to automatically integrate the top ranked item in the original list of items. That is, the system 900 does not require the user interface input to approve and/or reject the item. In such a case, system 900 is optional. As yet another alternative, user interface 920 may be presented periodically for user input. In any case, the user input can be fed into blocks 610 and 650 to update the rejection rate that is used by block 660 to predict the rejection rate. It will also be appreciated that a further user interface can be provided for the purpose of instructing a picker on a substitute for an item to be substituted. Such a user interface will indicate the item to be substituted and a ranked list of the order in which each of the substitute item should be attempted to be obtained by the picker. That is, the picker should go to a location to obtain the top ranked item, and if not available proceed to the next ranked item, and so on until a substitute item is obtained. The picker may be required by the further user interface to confirm which substitute has been picked, such as by capturing an image using the system on which the further user interface is displayed. The further user interface may enable the picker to open a two-way communication with a retailer to discuss the substitute to be picked.

Figure 10:
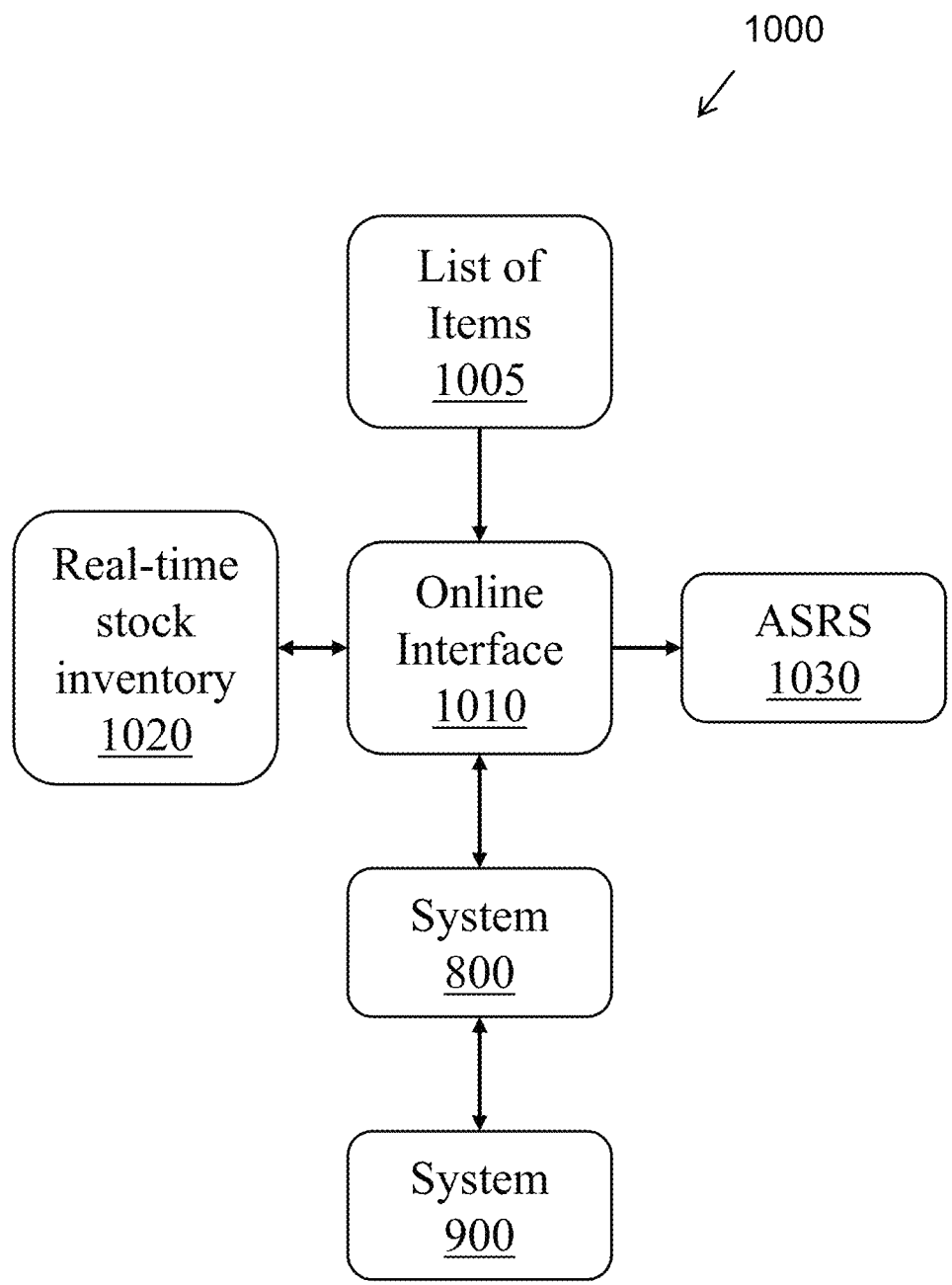
FIG. 10 depicts a system for automatically picking a substitute item.

System 800 and/or system 900 can be used as part of a fully automated end-to-end system 1000 as shown in FIG. 10. System 1000 may have an online interface 1010 for receiving a list of items 1005 (e.g. a customer of order). Interface 1010 may interact with a real-time stock inventory 1020 to determine that an item of the list of items is not available (i.e. out of stock), and is to be substituted. Upon determining this, interface 1010 interacts with system 800 to determine a substitute. Upon determining at least one substitute, system 800 optionally outputs at least one substitute to system 900. Upon confirming the substitute is acceptable (either automatically by being the top ranked substitute, or via user interface 910), interface 1010 updates the list of items to replace the item to be substituted with the accepted/confirmed substitute. Interface 1010 then interacts with an automated storage and retrieval system, ASRS, 1030 to automatically retrieve and prepare the items (including at least one substitute) for shipping. An ASRS may be of the type described in WO2015019055A1 ("Ocado"), hereby incorporated by reference, where robotic load handling devices operate on a grid structure to automatically retrieve item for shipping. In general any automated system can be used.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for analyzing a plurality of items, wherein:
    a first trained model trained on a first training data set comprising names, descriptions, and categories of the plurality of items, a second trained model trained on a second training data set comprising primary categories for items, a third trained model trained on a third training a set comprising acceptable and unacceptable pairings of items, and a fourth trained model trained on a fourth training data set comprising rejection rates of items when offered as substitutes are arranged in a pipeline such that outputs of earlier trained models in the pipeline are provided as inputs to later trained models in the pipeline, and
    the method comprises:
        identifying a target item;

filtering, using the first trained model, the plurality of items to obtain at least one similar item to the target item, and outputting the at least one similar item;
providing the at least one similar item output from the first trained model as input to the second trained model;
identifying, using the second trained model, a primary category of the target item and a primary category of the at least one similar item, and outputting the primary category of the target item and the primary category of the at least one similar item;
providing the at least one similar item output from the first trained model, the primary category of the target item from the second trained model, and the primary category of the at least one similar item from the second trained model, as input to the third trained model;
identifying, using the third trained model, potential substitutes for the target item based on the at least one similar item, the primary category of the target item, and the primary category of the at least one similar item;
providing the potential substitutes to the fourth trained model; and
ranking, using the fourth trained model, the potential substitutes based on a rejection probability of each of the potential substitutes,
wherein the first trained model, second trained model third trained model, and fourth trained model are configured to generate ent temporal intervals.

2. The computer-implemented method of claim 1, further comprising outputting the ranked potential substitutes.

3. The computer-implemented method of claim 1, wherein the method is performed in response to identifying that the target item is to be substituted.

4. The computer-implemented method of claim 1, further comprising:
receiving an order via an e-commerce platform, wherein the order comprises a subset of the plurality of items, wherein the subset comprises the target item; and
updating the order to include a top ranked item of the ranked potential substitutes.

5. The computer-implemented method of claim 4, wherein the e-commerce platform comprises a grocery e-commerce platform.

6. The computer-implemented method of claim 1, wherein the ranked potential substitutes are outputted on a user interface.

7. The computer-implemented method of claim 6, wherein the user interface is configured to receive an input to reject and/or accept each of the ranked potential substitutes.

8. The computer-implemented method of claim 6, wherein the user interface is configured to provide instructions to a picker to obtain at least one of the ranked potential substitutes.

9. The computer-implemented method of claim 7, wherein interactions with the user interface to reject and/or accept one or more of the ranked potential substitutes are used as an input to the fourth trained model.

10. The computer-implemented method of claim 1, wherein the first trained model comprises a natural language processing (NLP) model, and wherein using the NLP model comprises:
receiving at least one of:
names of the plurality of items;
descriptions of the plurality of items; or
categories of the plurality of items;
processing at least one of: the names of the plurality of items, descriptions of the plurality of items, or categories of the plurality of items, to determine at least one respective metric; and
using the at least one respective metric as an input to the NLP model to determine at least one similar item to the target item.

11. The computer-implemented method of claim 1, wherein the second trained model comprises a random forest classifier, and wherein using the random forest classifier comprises:
receiving at least one of:
the target item and at least one similar item;
a name of the target item and a name of the at least one similar item; or
a description of the target item and a description of at least one similar item;
processing at least one of: the target item and at least one similar item, a name of the target item and a name of the at least one similar item, or a description of the target item and a description of at least one similar item, to determine at least one respective metric; and
using the at least one respective metric as an input to the random forest classifier to determine the primary category of the target item and the primary category of the at least one similar item.

12. The computer-implemented method of claim 1, wherein the third trained model comprises a random forest classifier, and wherein using the random forest classifier comprises:
receiving at least one of:
the target item and at least one similar item;
one or more back-of-pack tags of the target item and one or more back-of-pack tags of at least one similar item; or
a name of the target item and a name of at least one similar item;
processing at least one of: the target item and at least one similar item, the one or more back-of-pack tags of the target item and the one or more back-of-pack tags of the at least one similar item to determine at least one respective metric, or the name of the target item and the name of the at least one similar item, to determine at least one respective metric; and
using the at least one respective metric as an input to the random forest classifier to determine the potential substitutes for the target item.

13. The computer-implemented method of claim 12, wherein a number of the potential substitutes are reduced using a rules-based system.

14. The computer-implemented method of claim 1, wherein the fourth trained model comprises a random forest regressor, and wherein using the random forest regressor comprises:
receiving at least one of:
a first subset comprising at least one of:
a name of the target item and a name of at least one similar item of the potential substitutes;
a description of the target item and a description of the at least one similar item of the potential substitutes; or
a primary category of the target item and a primary category of the at least one similar item of the potential substitutes;

a customer revenue segment of the target item and a customer revenue segment of the at least one similar item of the potential substitutes;
one or more back-of-pack tags of the target item and one or more back-of-pack tags of the at least one similar item of the potential substitutes;
a second subset comprising at least one of:
a unit-of-measure of the target item and a unit-of-measure of the at least one similar item of the potential substitutes;
a price of the target item and a price of the at least one similar item of the potential substitutes; or
a sales trend of the target item and a sales trend of the at least one similar item of the potential substitutes; or
a rejection rate of the at least one similar item of the potential substitutes when selected as a substitute of the target item;
processing the first subset, the customer revenue segment of the target item and the customer revenue segment of the at least one similar item of the potential substitutes, the back-of-pack tags of the target item and the back-of-pack tags of the at least one similar item of the potential substitutes, the second subset, or the rejection rate of the at least one similar item of the potential substitutes when selected as a substitute for the target item to determine at least one respective metric; and
using the at least one respective metric as an input to the random forest regressor to rank the rejection probability of each of the potential substitutes.

15. The computer-implemented method of claim 1, wherein:
the first trained model and the second trained model are configured to generate output at a first temporal interval,
the third trained model is configured to generate output at a second temporal interval,
the fourth trained model is configured to generate output at a third temporal interval,
the first temporal interval is greater than the second temporal interval, and
the second temporal interval is greater than the third temporal interval.

16. A processing system, comprising: a memory comprising computer-executable instructions; and a processor configured to execute the computer-executable instructions and cause the processing system to:
arrange in a pipeline, a first trained model trained on a first training data set comprising names, descriptions, and categories of a plurality of items, a second trained model trained on a second training data set comprising primary categories for items, a third trained model trained on a third training data set acceptable and unacceptable pairings of items, and a fourth trained model trained on a fourth training data set comprising rejection rates of items when offered as substitutes, such that outputs of earlier trained models in the pipeline are provided as inputs to later trained models in the pipeline,
identify a target item;
filter, using the first trained model, the plurality of items to obtain at least one similar item to the target item, and output the at least one similar item;
provide the at least one similar item output from the first trained model as input to the second trained model;
identify, using the second trained model, a primary category of the target item and a primary category of the at least one similar item, and output the primary category of the target item and the primary category of the at least one similar item;
provide the at least one similar item output from the first trained model the primary category of the target item from the second trained model, and the primary category of the at least one similar item from the second trained model, as input to the third trained model,
identify, using the third trained model, potential substitutes for the target item based on the at least one similar item, the primary category of the target item, and the primary category of the at least one similar item;
provide the potential substitutes to the fourth trained model; and
rank, using the fourth trained model, the potential substitutes based on a rejection probability of each of the potential substitutes,
wherein the first trained model, second trained model, third trained model, and fourth trained model are configured to generate output at different temporal intervals.

17. A computer program product embodied on a computer-readable medium comprising code for performing a method, the method comprising:
arranging in a pipeline, a first trained model trained on a first training data set comprising names, descriptions, and categories of a plurality of items, a second trained model trained on a second training data set comprising primary categories for items, a third trained model trained on a third training data set comprising acceptable and unacceptable pairings of items, and a fourth trained model trained on a fourth training data set comprising rejection rates of items when offered as substitutes, such that outputs of earlier trained models in the pipeline are provided as inputs to later trained models in the pipeline,
identifying a target item;
filtering, using the first trained model, the plurality of items to obtain at least one similar item to the target item, and outputting the at least one similar item;
providing the at least one similar item output from the first trained model as input to the second trained model;
identifying, using the second trained model, a primary category of the target item and a primary category of the at least one similar item, and outputting the primary category of the target item and the primary category of the at least one similar item;
providing the at least one similar item output from the first trained model, the primary category of the target item from the second trained model, and the primary category of the at least one similar item from the second trained model, as input to the third trained model;
identifying, using the third trained model, potential substitutes for the target item based on the at least one similar item, the primary category of the target item, and the primary category of the at least one similar item;
providing the potential substitutes to the fourth trained model; and
ranking, using the fourth trained model, the potential substitutes based on a rejection probability of each of the potential substitutes,
wherein the first trained model, second trained model, third trained model, and fourth trained model are configured to generate output at differ oral intervals.

* * * * *

UNITED STATES PATENT AND TRADEMARK OFFICE
CERTIFICATE OF CORRECTION

PATENT NO. : 12,243,087 B2
APPLICATION NO. : 18/222966
DATED : March 4, 2025
INVENTOR(S) : Qiaole Zhao et al.

Page 1 of 1

It is certified that error appears in the above-identified patent and that said Letters Patent is hereby corrected as shown below:

In the Claims

Column 11, Line 30 Claim 1, delete "ent" and insert -- different --.

Column 14, Line 65 Claim 17, delete "differ oral" and insert -- different temporal --.

Signed and Sealed this
Fifteenth Day of April, 2025

Coke Morgan Stewart
*Acting Director of the United States Patent and Trademark Office*